US008655143B2

(12) United States Patent
Begen et al.

(10) Patent No.: US 8,655,143 B2
(45) Date of Patent: Feb. 18, 2014

(54) SUPPLEMENTARY BUFFER CONSTRUCTION IN REAL-TIME APPLICATIONS WITHOUT INCREASING CHANNEL CHANGE DELAY

(75) Inventors: Ali C. Begen, Vancouver (CA); Tankut Akgul, Istanbul (TR)

(73) Assignee: Cisco Technology, Inc., San Jose, CA (US)

( * ) Notice: Subject to any disclaimer, the term of this patent is extended or adjusted under 35 U.S.C. 154(b) by 957 days.

(21) Appl. No.: 12/416,338

(22) Filed: Apr. 1, 2009

(65) Prior Publication Data

US 2010/0254673 A1  Oct. 7, 2010

(51) Int. Cl.
    H04N 9/80 (2006.01)
(52) U.S. Cl.
    USPC ............ 386/239; 386/240; 386/241; 386/337
(58) Field of Classification Search
    USPC .......................... 386/239, 240, 337; 370/474
    See application file for complete search history.

(56) References Cited

U.S. PATENT DOCUMENTS

| 6,882,637 | B1 | 4/2005 | Le et al. |
| 6,912,224 | B1 | 6/2005 | Duault ........................ 370/412 |
| 7,023,926 | B2 | 4/2006 | Matsuura et al. |
| 7,245,600 | B2 | 7/2007 | Chen ............................ 370/335 |
| 7,324,444 | B1 | 1/2008 | Liang ........................... 370/230 |
| 7,643,513 | B2 | 1/2010 | Yang et al. |
| 7,830,908 | B2 | 11/2010 | Akgul et al. |
| 8,111,971 | B2 | 2/2012 | Akgul |
| 2003/0231870 | A1* | 12/2003 | Nagahara et al. .............. 386/96 |
| 2005/0033177 | A1 | 2/2005 | Rogers et al. |
| 2007/0009235 | A1 | 1/2007 | Walters ........................ 386/112 |
| 2007/0121620 | A1 | 5/2007 | Yang et al. |
| 2008/0168470 | A1* | 7/2008 | Bushell et al. ................ 719/313 |
| 2008/0175558 | A1* | 7/2008 | Shin et al. ........................ 386/66 |
| 2008/0304810 | A1 | 12/2008 | Rijckaert et al. |
| 2008/0310647 | A1 | 12/2008 | Mukaide |

(Continued)

OTHER PUBLICATIONS

De Castro, "Real-time Subtitle Synchronization in Live Television Programs", 2011, IEEE, p. 1-6.*
U.S. Appl. No. 60/992,714, filed Dec. 5, 2007, entitled "Fast Channel Change of Digital Media Using Multiple Decoder Clocks", Inventor: Tankut Akgul.

(Continued)

Primary Examiner — Taghi Arani
Assistant Examiner — Gregory Lane
(74) Attorney, Agent, or Firm — Merchant & Gould P.C

(57) ABSTRACT

Embodiments may be disclosed herein that provide systems, devices, and methods of processing a program stream, the program stream comprising a video and an audio stream. One such embodiment is a method comprising: initializing an audio reference clock to a value associated with a presentation timestamp for a decodable audio frame which is the first audio frame capable of being decoded in the audio stream; initializing a video reference clock to a value associated with a presentation timestamp for a decodable video frame which is the first video frame capable of being decoded in the video stream; storing audio frames received prior to receipt of the decodable video frame which is the first video frame capable of being decoded in the video stream in an audio frame buffer; starting audio and video reference clocks after a video preroll delay, which is the difference between the first decodable video frame PTS and the value of PCR at the time that PTS is received, has elapsed; decoding the audio stream in accordance with the audio reference clock; and decoding the video stream in accordance with the video reference clock.

12 Claims, 7 Drawing Sheets

(56) References Cited

U.S. PATENT DOCUMENTS

| | | |
|---|---|---|
| 2009/0116814 A1 | 5/2009 | Morohashi et al. |
| 2009/0122192 A1* | 5/2009 | Baldwin et al. ............... 348/512 |
| 2009/0129752 A1* | 5/2009 | Yamada et al. ............... 386/102 |
| 2009/0141793 A1* | 6/2009 | Gramelspacher et al. ........................ 375/240.01 |
| 2009/0154615 A1* | 6/2009 | Hijikata et al. ............... 375/344 |
| 2010/0254408 A1* | 10/2010 | Kuno et al. ................... 370/474 |
| 2011/0075997 A1 | 3/2011 | Begen et al. |

OTHER PUBLICATIONS

U.S. Non-Final Office Action mailed Apr. 6, 2012 in U.S. Appl. No. 12/569,982, 12 pages.

U.S. Non-Final Office Action mailed Nov. 8, 2012 in U.S. Appl. No. 12/569,982, 12 pages.

U.S. Final Office Action mailed May 3, 2013 in U.S. Appl. No. 12/569,982, 13 pages.

U.S. Non-Final Office Action mailed Oct. 18, 2013 in U.S. Appl. No. 12/569,982, 15 pages.

* cited by examiner

SUPPLEMENTARY BUFFER CONSTRUCTION IN REAL-TIME APPLICATIONS WITHOUT INCREASING CHANNEL CHANGE DELAY

FIELD OF THE DISCLOSURE

The present disclosure relates to digital media delivery, and more specifically, to systems and methods of processing audio and video contained in a media stream.

BACKGROUND

A growing number of consumers now have high-speed, or broadband, connections to the Internet in their homes. The increased bandwidth provided by these broadband connections allows the delivery of digital television, video, and multimedia services to customer premises (e.g., home consumers). These services may be transported over a network as media streams. At the customer premises, a digital media receiver may decode one or more media streams. The digital media receiver may also generate a picture signal for display by a television or monitor.

BRIEF DESCRIPTION OF THE DRAWINGS

The accompanying drawings, which are incorporated herein constitute a part of this disclosure, illustrate various embodiments of the present invention. In the drawings.

Figure 1:
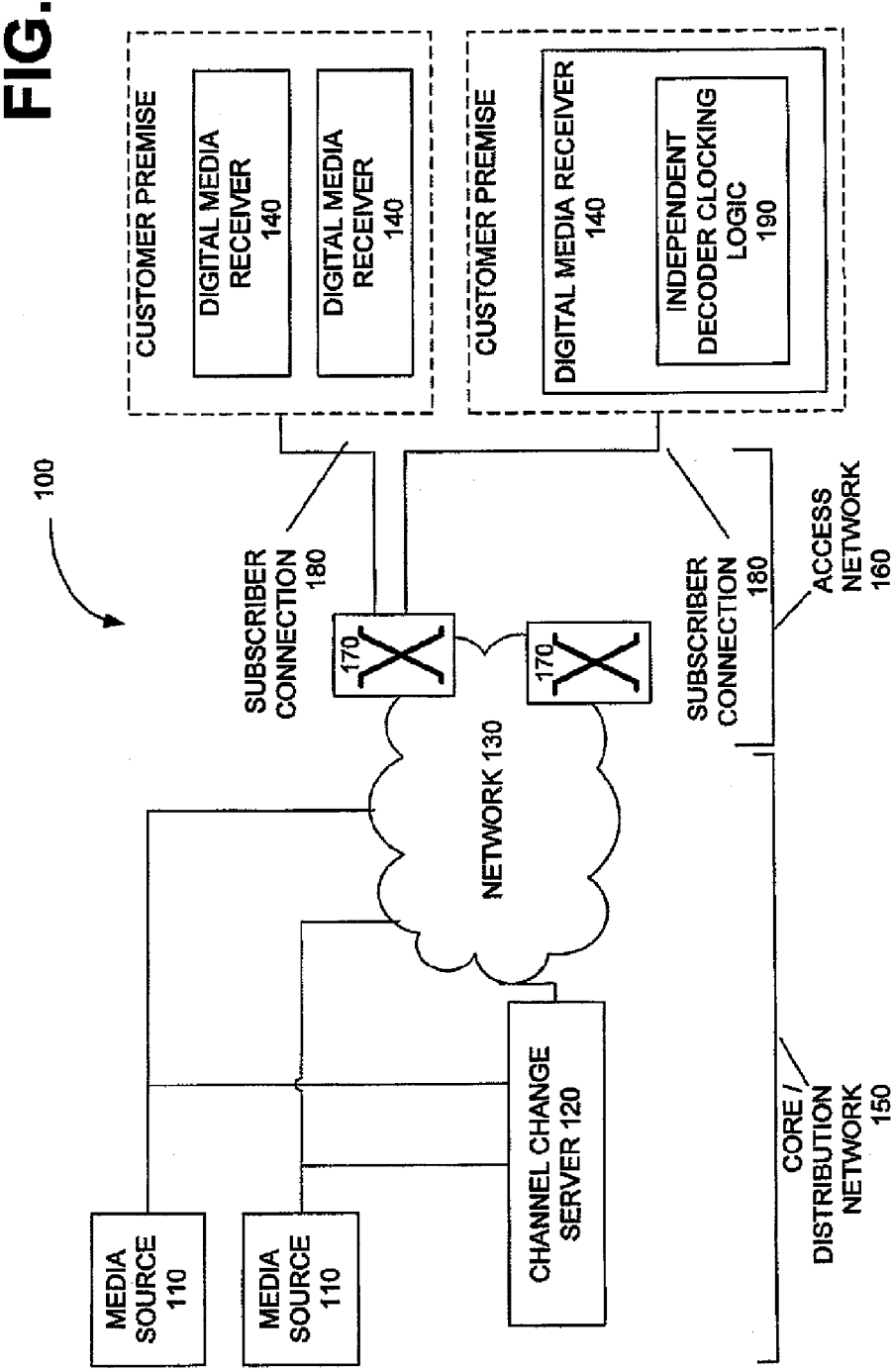
FIG. 1 is a block diagram of an environment in which embodiments of a system and method for synchronizing media streams is located.

Both the foregoing general description and the following detailed description provide examples and are explanatory only. Accordingly, the foregoing general description and the followed detailed description should not be considered to be restrictive. Further, features or variations may be provided in addition to those set forth herein. For example, embodiments may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A digital media receiver usually has to buffer some portion of a media stream before it can start playing that stream. One of the common reasons for this may be the rate variation of incoming information. Rate variation may be caused by jitter present in the network. Network jitter may cause different data packets to experience different amounts of delay during transmission. The variation in delay may result in different inter-arrival times between packets acquired at the receiver side. Therefore, in order not to starve during instances where packets arrive with longer intervals, a media receiver may need to buffer sufficient packets beforehand.

Compression may also cause rate variation in the stream. Compression may not be applied with equal efficiency on all parts of a media stream. For instance, a complex scene may be represented with more bits than a simple scene in compressed form. Therefore, it may take more time for a media receiver to acquire a complex scene than a simple scene over a constant bitrate transmission line. Again, in order to not interrupt playback over such scenes, a media receiver may need to buffer sufficient data beforehand.

Furthermore, compression may require information to be processed out of order for achieving better compression efficiency. This may cause a receiver to acquire an incoming stream in a different order than the presentation order and thus may necessitate additional buffering at the receiver to perform re-ordering before presentation.

Buffering may also be required for loss-repair methods such as Forward Error Correction (FEC) or retransmission of packets where the receiver may encounter further delays in the incoming stream.

The minimum amount of buffering a receiver needs to perform for interrupt-free playback may usually be sent as information within the stream. A compliant media receiver may perform buffering based on this information. However, this buffering amount may be calculated based on a theoretical reference producer-consumer model which may not take into account real-life imperfections such as bad network conditions, faulty equipment, or incorrect head-end configuration. Therefore, it may be beneficial to buffer more than the advertised amount of data to accommodate such unexpected conditions in an end-to-end system.

However, buffering comes with a tradeoff. The more buffering that may be performed, the more time it may take to start the playback. Especially during switching to a new media stream, this initial delay associated with buffering may largely impact the user experience. Therefore, it is desirable to perform extra buffering to secure smooth playback behavior in imperfect environments without increasing the initial buffering delay.

Embodiments may be disclosed herein that provide systems, devices, and methods of processing a program stream, the program stream comprising a video and an audio stream. One such embodiment is a method comprising: initializing an audio reference clock to a value associated with a presentation timestamp for a decodable audio frame which is the first audio frame capable of being decoded in the audio stream; initializing a video reference clock to a value associated with a presentation timestamp for a decodable video frame which is the first video frame capable of being decoded in the video stream; storing audio frames received prior to receipt of the decodable video frame which is the first video frame capable of being decoded in the video stream in an audio frame buffer; starting audio and video reference clocks responsive to receipt of the decodable video frame which is the first video frame capable of being decoded in the video stream; decoding the audio stream in accordance with the audio reference clock; and decoding the video stream in accordance with the video reference clock.

One such digital media playback device includes: an audio reference clock; an audio frame buffer configured to store received frames in an audio stream; an audio decoder configured to decode frames in the audio decoder buffer at times based on a comparison of a time stamp for each frame and a current value of the audio reference clock; a video reference clock; a video frame buffer configured to store received frames in a video stream, the video stream and the audio stream making up a program stream; a video decoder configured to decode frames in the video decoder buffer at times based on a comparison of a timestamp for each frame and a current value of the video reference clock; and independent decoder clocking logic configured to: set the audio reference clock to an initial value based on a presentation timestamp for a frame that is the first decodable frame in the audio stream; set the video reference clock to an initial value based on a presentation timestamp for a frame that is the first decodable frame in the video stream; start the audio and the video reference clocks after a buffering period where the video reference clock initially runs at a slower rate than the audio reference clock; and normalize the video reference clock rate when the audio reference clock catches up with the video reference clock.

Another such method of processing a program stream comprises: receiving a decodable audio frame which is the first audio frame capable of being decoded in the audio stream; buffering each decodable audio frame received prior to receipt of a decodable video frame which is the first video frame capable of being decoded in the video stream; determining whether the decodable video frame which is the first video frame capable of being decoded in the video stream has been received; and starting an audio clock and a video clock after a buffering period.

FIG. 1 illustrates an environment in which certain embodiments may be located. System 100 may deliver various digital services to subscribers, which may include television programming, video-on-demand, pay-per-view, music, internet access, shopping, and telephone. These services are delivered using media streams, which may be provided from various sources. One such source may be a media source 110, which may encode content from a media producer, such as a cable network or an on-air television station. Note that there may be other types of media sources in addition to the encoders.

Other sources of media streams may be intended for use in certain embodiments. Various media stream sources may be located at a facility known as a "headend" which is operated by a service provider (e.g., cable television company). However, these components are not limited to residing at that location. Common encoding formats for media streams include MPEG-2, MPEG-4, and VC-1, but others are contemplated to be within the scope of this disclosure. In some environments, the encoded media stream may represent a single user program, and thus may contain a video elementary stream and an audio elementary stream multiplexed together into a single program transport stream (SPTS).

Media streams may be delivered over a network 130 to one or more digital media receivers 140. In the example environment of FIG. 1, network 130 may include a core/distribution network 150 and an access network 160. Multiple media streams may be combined and packetized into a media packet stream, in a form which may be suitable for transport over core/distribution network 150. A media packet stream, carrying multiple user programs that are destined for many different subscribers, may be transported over core/distribution network 150, and delivered to various switches 170 located at the network edge. Each switch 170 may select, for a particular subscriber, a subset of the programs carried in the media packet stream, and produce a stream which may be delivered, via subscriber connections 180, to those subscribers connected to switch 170. In embodiments the delivered stream may use multicast addresses or unicast addresses.

Digital media receiver 140 may receive, via subscriber connection 180, a media packet stream carrying the selected programs. Digital media receiver 140 may convert the stream of media packets into an analog or digital video signal, which may be supplied to a display (e.g., a television or computer monitor) for viewing by a customer. Embodiments of digital media receiver 140 may also provide interactive features, such as an electronic program guide (EPG), web browser, or DVR (digital video recorder) functionality. In some embodiments, digital media receiver 140 may take the form of a set-top box. In others, digital media receiver 140 may be implemented by a personal computer (PC). The term "digital media receiver" extends to other types of receivers that include the capability to receive and process compressed digital media streams. Examples of other types of receivers include: hand-held and/or mobile receivers that may be coupled to a transmission channel which carries media packet streams; video-services-enabled receivers (VSERs); and other electronic devices such as media players.

A subset of program streams may be selected by switch 170 for delivery to a particular subscriber location. Each of these program streams may be viewed as being carried on a different logical channel. Digital media receiver 140 may communicate with channel change server 120 to request that particular program streams, or logical channels, to be included in the media packet stream received by that subscriber. For example, digital media receiver 140, in response to a user request to watch the FOX network, may request a channel change from channel change server 120, with the target channel as FOX. In some embodiments, channel change logic within digital media receiver 140 may interact with channel change server 120 and with decoders in digital media receiver 140 to switch from one stream to another.

Although the term "channel change" may be used herein, this term is not limited to user requests. This term may also be intended to cover requests that are not user-initiated (e.g., an automatic change to a logical channel at a specific time for recording or viewing). The term "channel" may not be limited to a traditional television channel, but may encompass any stream associated with a particular media content instance or service.

A channel change (or other stream transition event) may cause digital media receiver 140 to begin decoding a different stream. As a result, some amount of delay may be incurred before the content of the new stream may be decoded and displayed. Digital media receiver 140 may include independent decoder clocking logic 190, which implements a system and/or method for reducing media stream delay through independent decoder clocks.

A program stream may typically include a video stream and a corresponding audio stream. These two types of streams may experience different amounts of delay or latency in the system. A transmitted reference clock in combination with timestamps in the video and audio streams may allow synchronization of the two streams at digital media receiver 140. Media source 110 may generate the reference clock and periodically insert timestamps, in the form of program clock references (PCR) or system clock references (SCR), into the transmitted stream. Digital media receiver 140 may recover the clock reference by using a local oscillator which may be corrected by the clock references (PCR/SCR) received from media source 110. The recovered clock may be known as the System Time Clock (STC). Media source 110 may also insert decoding and presentation timestamps (DTS/PTS) in the video and audio streams. A decoding timestamp (DTS) may determine when the frame will be provided to the decoder for decoding, while a presentation timestamp (PTS) determines when the decoder outputs the frame for display. In this disclosure, the term "timestamp" may refer to DTS, PTS, or both.

Figure 2:
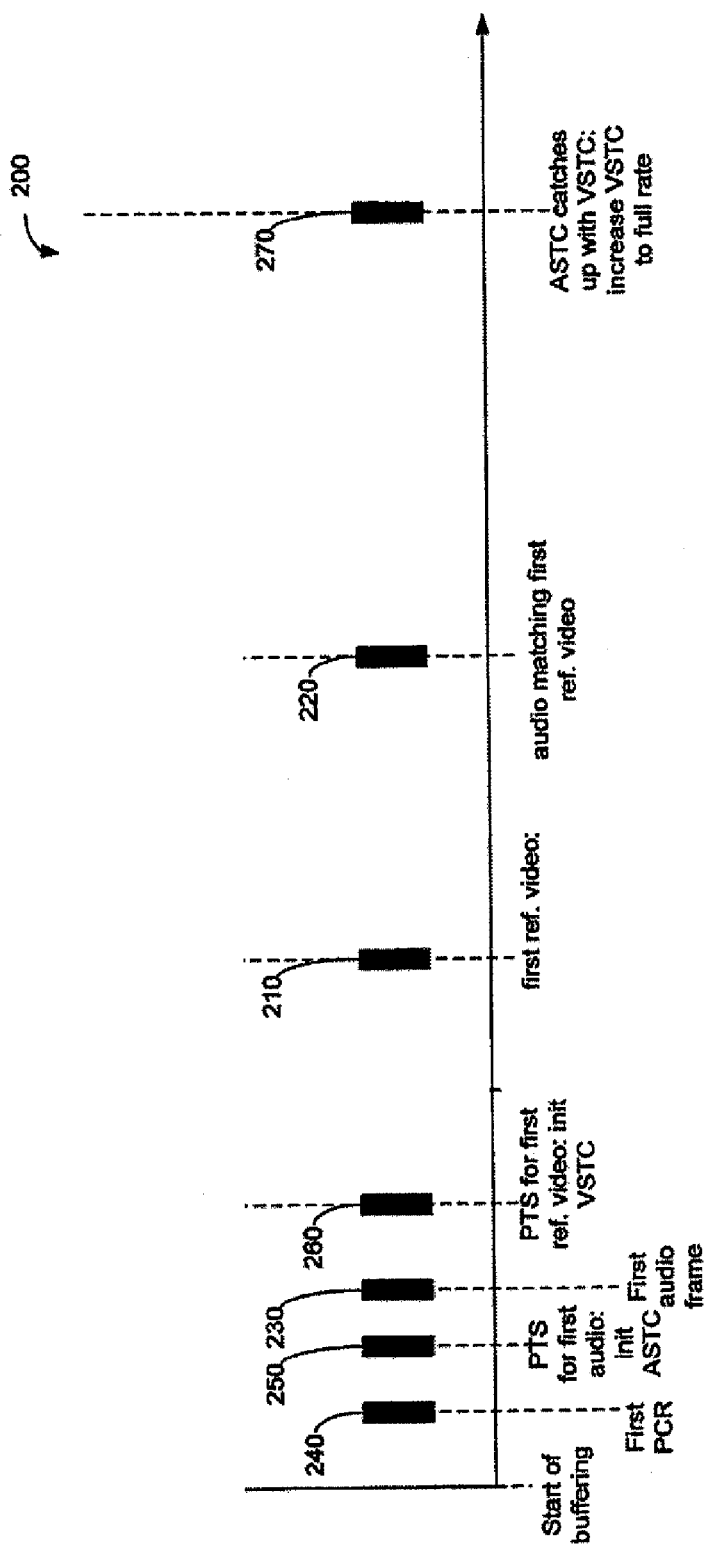
FIG. 2 is a block diagram showing embodiments of audio and video frame reception and processing.

The techniques employed by independent decoder clocking logic 190 to increase media stream buffering amount without increasing buffering delay will now be described in connection with FIG. 2. Audio and video frame reception and processing at digital media receiver 140 may be illustrated with reference to timeline 200. The earliest point in time appears on the left of timeline 200, although the scale may not necessarily be linear. Since video processing generally may take longer than audio processing, digital media receiver 140 generally may require video to be buffered longer than audio. As a consequence of this requirement, media source 110 may send the first reference video frame 210 in advance of the corresponding or matching audio frame 220. This means the first audio frame 230 that started to be received contemporaneously with first video frame 210 may have a PTS value smaller (i.e., earlier) than the first video frame 210—as do all audio frames (not shown) received before audio frame 220. Stated differently, each of those audio frames has missed the video frame associated with the time instant corresponding to its PTS. These "late" frames may be buffered by an audio decoder buffer 335.

When the first Program Clock Reference 240 may be received, the video and audio decoder clocks in digital media receiver 140 may not be started. Instead, the audio system time clock (ASTC) may be initialized—but not started—when the PTS for the first decodable audio frame 250 is received. The video STC (VSTC) may be initialized—but not started—when the PTS for the first decodable video frame 260 is received. The ASTC and VSTC may start running after a buffering delay elapses. This buffering delay is equal to the difference between the first decodable video frame PTS and the value of PCR at the time that PTS is received by the receiver. This delay is also known as the video pre-roll delay. The video pre-roll delay increases the initial buffering level, without modifying the channel change time.

When the buffering delay elapses, both decoder clocks may be started at the same time, with VSTC running at a slower rate than ASTC. In some embodiments, VSTC runs at about 80% of ASTC, but other ratios are possible. When ASTC catches up with VSTC, the VSTC rate is adjusted to match the rate of ASTC.

To summarize, digital media receiver 140 may use separate reference clocks for the video and the audio decoders. The video and audio frames may then be consumed from their respective buffers at a rate determined by their respective reference clocks, where these two rates differ. The video decoder may be initialized with a value which represents a time value later than the audio decoder's initial time value, and the two clocks are started at the same time. Therefore, the video clock may start at a position which may be ahead of the audio clock, which means video presentation may begin at a position which is ahead of audio presentation. However, the video clock rate may be set to be slower than the audio clock rate, so the audio stream may catch up at some point with the video stream. At this point, the video decoder clock speed may be increased to match the audio decoder clock speed, and both run at the same rate.

Figure 3:
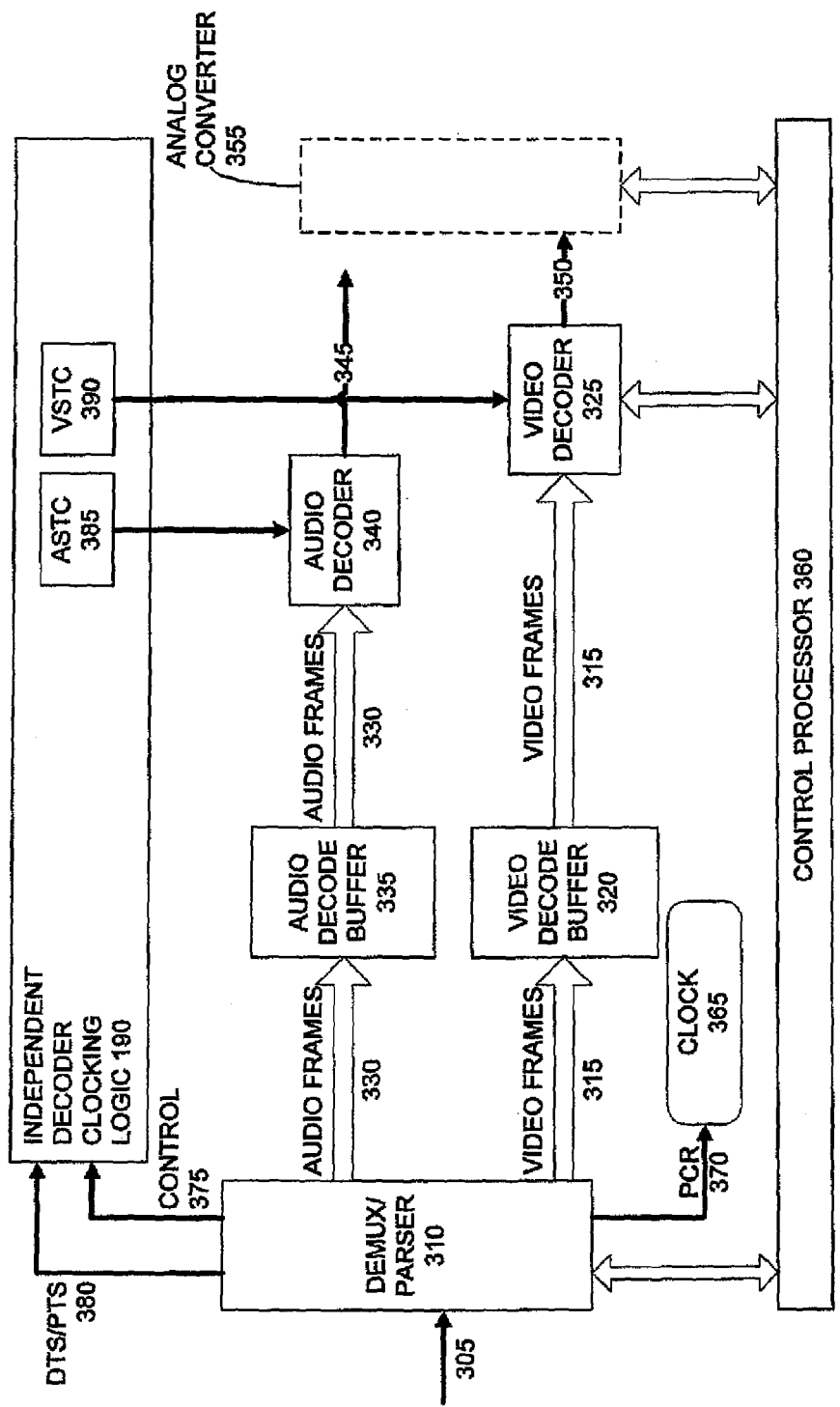
FIG. 3 is a block diagram of selected components within embodiments of the digital media receiver.

FIG. 3 illustrates a block diagram of embodiments within digital media receiver 140. A digital media transport stream 305, which may contain different stream types, may be provided to a transport stream demultiplexer/parser 310. Demultiplexer 310 may identify audio and video streams through program identifiers (PIDs) carried within stream 305. Video frames 315 from stream 305 may be stored in a video decoder buffer 320, then decoded by a video decoder 325. Audio frames 330 from stream 305 may be stored in an audio decoder buffer 335 then decoded by an audio decoder 340. After decoding, audio data 345 may be provided as output to a speaker and video data 350 may be provided as output to a display. In certain embodiments, the data may be converted to analog by converter 355, but this conversion is optional. Operation of the various components in the decoder pipeline may be coordinated by a control processor 360.

Demultiplexer/parser 310 may also perform a parsing function, extracting program clock reference (PCR) values from transport stream packets and timestamps (DTS and/or PTS) from packetized elementary stream (PES) packets. Receiver clock 365 may be controlled by a local oscillator (not shown) and the PCR values 370 may be used to correct phase error relative to the transmitter clock. Independent decoder clocking logic 190 may also receive various control signals 375 from demultiplexer 310 which indicate the arrival of various types of frames and may drive the behavior of logic 190. Logic 190 may also receive timestamps 380 (DTS and/or PTS) from demultiplexer 310 in conjunction with appropriate control signals 375. Audio decoder 340 may be driven by audio clock values pulled from ASTC register 385 and video decoder 325 may be driven by video clock values pulled from VSTC register 390, where those registers may be initialized and counting may be enabled as described in connection with FIG. 2. Logic 190 may also include various parameters (e.g., VSTC rate, and ASTC rate (not shown)).

Figure 4A:
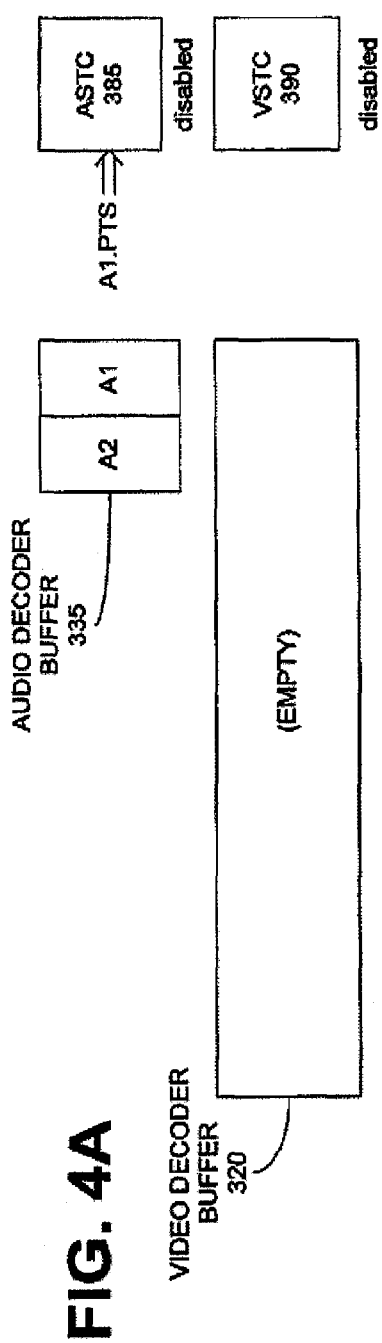
FIGS. 4A-4C show embodiments of the video and audio decoders of FIG. 3 at various points in time.
Figure 4B:
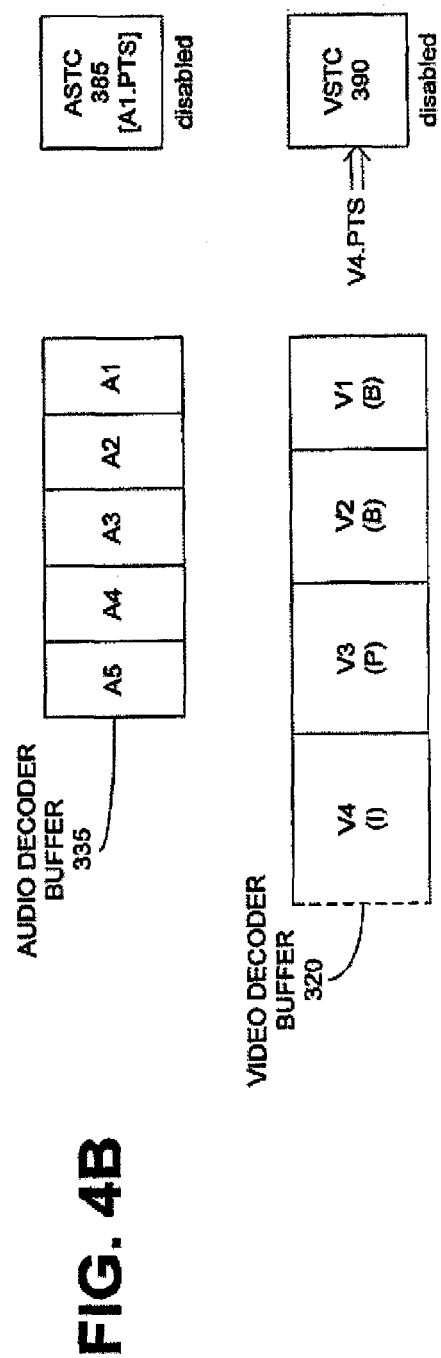
Figure 4C:
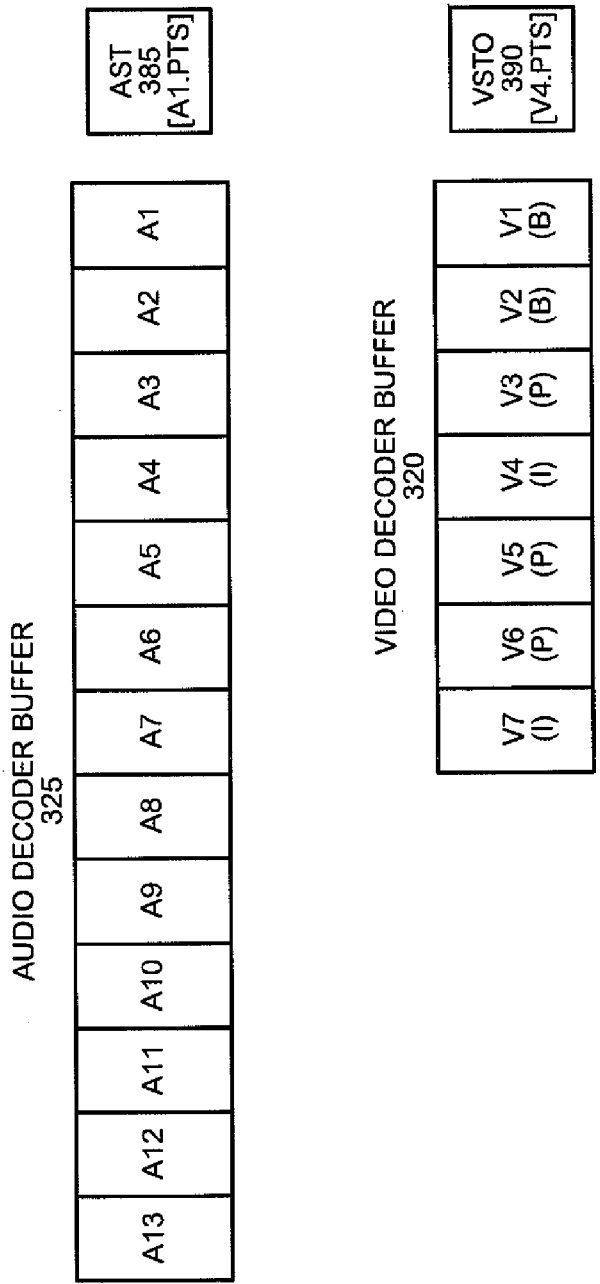

Embodiments of digital media receiver 140 will now be described. FIGS. 4A-4C show the contents of video decoder buffer 320 and audio decoder buffer 335 at various points in time, and show how the values in ASTC 385 and VSTC 390 may be set in response to the arrival of various frames in the buffers.

FIG. 4A depicts the digital media stream shortly after a acquiring a new stream (e.g., as a result of a channel change). ASTC 385 and VSTC 390 may not yet be initialized, and may not be running. (Since the clocks were running to decode the previous stream, in some embodiments the two clocks may be stopped upon detection of a new stream.) Shortly after acquiring the stream, the first few audio frames may arrive in audio decoder buffer 335. The arrival of the first decodable audio frame with a PTS (A1) may trigger the initialization of ASTC 385, which may be set to that PTS. ASTC 385 may therefore be set to the PTS of A1. Although ASTC 385 has been initialized, the clock may not be started yet. Note that in most encoding schemes, all audio frames may be decodable, but the techniques described herein also cover encoding schemes that allow for non-decodable audio frames. Next, another audio frame A2 may be received. At this point, audio decoder buffer 335 may contain A1-A2 and video decoder buffer 320 may be empty.

FIG. 4B depicts the digital media stream at a later point in time, when the start of the first reference video frame (e.g., an I-frame) arrives in video decoder buffer 320. By this time, audio decoder buffer 335 may contain A1-A5, and video decoder buffer 320 may include complete frames V1 and V2 (B-frames), V3 (P-frame), and the start of V4 (I-frame). V4 is an I-frame that may be the first decodable video frame, and the arrival of the PTS for this first decodable video frame may trigger the initialization of VSTC 390 by independent decoder clocking logic 190. VSTC 390 may be set to the PTS of the first received decodable video frame. In this example, VSTC 390 may be set to the PTS of the I-frame V4. Although VSTC 390 has been initialized, the clock may not be started yet.

FIG. 4C depicts the digital media stream at a later point in time, when the video pre-roll delay has elapsed. The audio decoder buffer now may contain A1-A13. The video decoder buffer may contain complete frames V1 (B-frame), V2 (B-frame), V3 (P-frame), V4 (I-frame), V5 (P-frame), V6 (P-frame), and V7 (I-frame). Since the video pre-roll delay has elapsed, independent decoder clocking logic 190 may start ASTC 385 and VSTC 390. Since ASTC 385 was originally initialized to A1.PTS in FIG. 4A, in this scenario ASTC may start counting (i.e., periodically incrementing) from an initial value of A1.PTS. VSTC 390 may simultaneously start counting (i.e., periodically incrementing) from an initial value of V4.PTS.

As mentioned earlier, independent decoder clocking logic 190 may initially configure VSTC 390 to run at a slower rate than ASTC 385, to allow the audio stream—which starts with a lag relative to the video stream—to catch up to the video stream. Some implementations of logic 190 may implement VSTC 390 and ASTC 385 partially in software, using two virtual registers which may be incremented by interrupts from a single physical timer. These registers may serve as the source for VSTC 390 and ASTC 385, respectively. By adjusting the amount of the increment which occurs with each timer interrupt, the rate of VSTC 390 and ASTC 385 may be changed relative to each other. Other implementations may use two hardware timers, which may be derived from a common clock.

The playout behavior of two streams in certain embodiments will now be described. As explained earlier, VSTC 390 may run at a reduced rate compared to ASTC 385, so the clock period of VSTC 390 may be longer than the clock period of ASTC 385.

The first video frame to be presented may be V4. (Frames V1 through V3 may be received, but cannot be decoded/presented before the reference frame). At the same time, audio frames A1 and A2 may be presented. However, the audio frame corresponding to V4 may be A7. Thus, when seeing V4 and hearing A1 the user may perceive that the frames are out of sync. As the next few video frames may be presented from the buffer, the user still may perceive that the frames are not synchronized and further, that the audio lags the video. However, because video frames may be presented at a slower rate than audio frames, the audio stream may eventually catch up with the video stream.

Independent decoder clocking logic 190 may track the difference between VSTC and ASTC values. When the two are equal, logic 190 may adjust the rate of VSTC 390 to match the rate of ASTC 385. After that, the two decoder clocks may run at the same rate. If another channel change occurs, logic 190 may be invoked again to stop the running of the decoder clocks, re-initialize the clocks based on frames received in the decoder buffers, and start the clocks again based on frames received.

Thus, the overall effect of embodiments of the independent decoder clocking logic 190 may be summarized as follows. After an initial buffering delay, the video and audio streams may start playing at the same time. Since the encoder may send video first (relative to its corresponding audio), audio may initially lag video, and a viewer may experience audio and video as being out of sync. However, because video may play out at a slower rate, audio catches up with video at some point, and the user experiences the streams as being in sync. Once this sync is established, the audio and video remain synchronized. In some embodiments, the video may be frozen initially for an imperceptible period of time to assist with synchronization.

Since audio playback starts from the first decodable frame (A1) even though the audio frames from A1 to A6 are late with respect to video, this approach provides a larger initial audio buffer level than a conventional method, which would normally discard those late audio frames. Furthermore, since video playback is slowed down for a temporary initial period, video frames are consumed in a rate slower than the rate of their arrival. This results in a higher video buffering level than a conventional method, which strictly synchronizes the frame consumption rate with the frame arrival rate.

Figure 5:
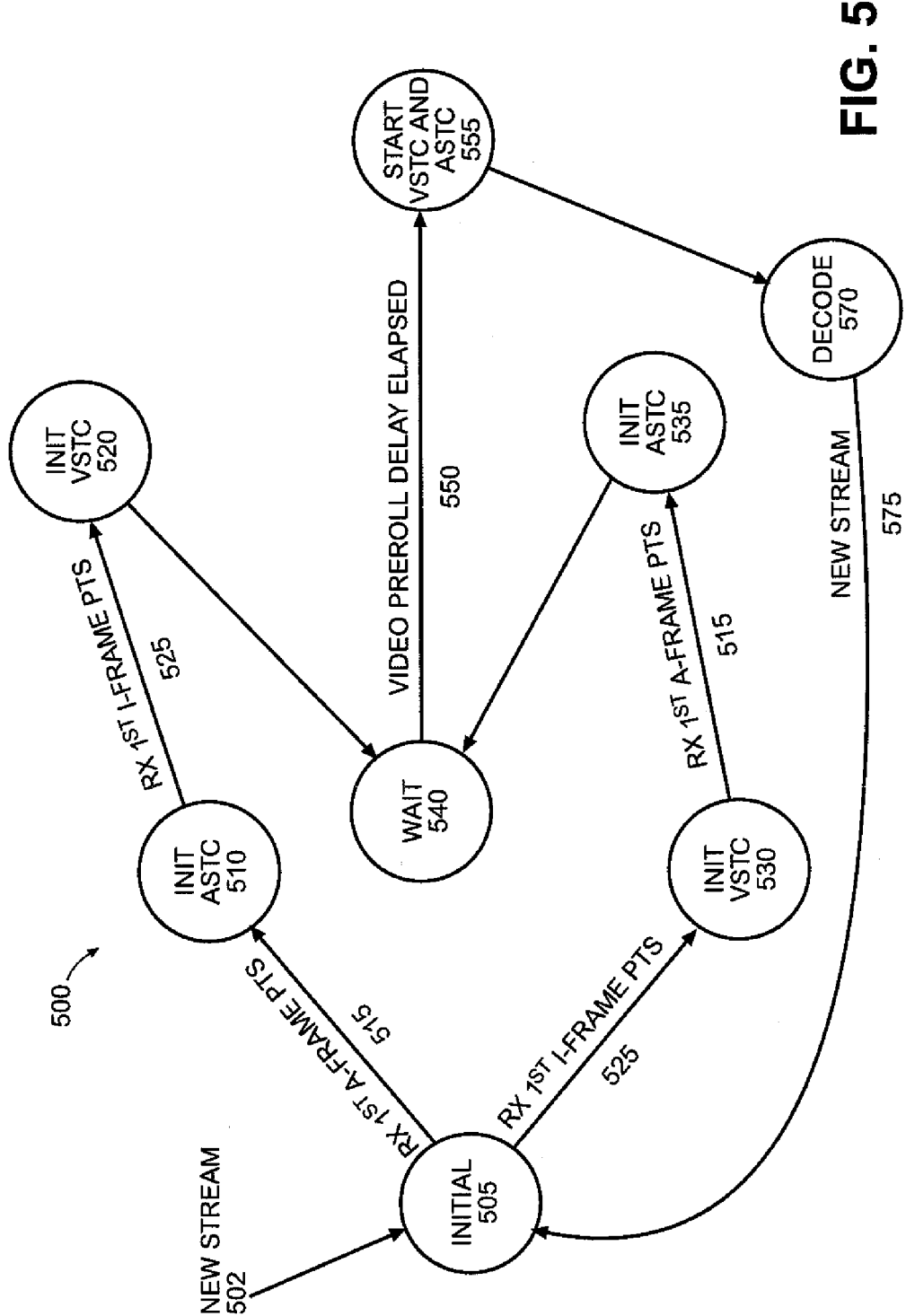
FIG. 5 is a state diagram illustrating operation of embodiments of the independent decoder clocking logic of FIG. 3.

FIG. 5 illustrates operation of embodiments of independent decoder clocking logic 190. Logic 190 may move to initial state 505 upon receiving the start of a new stream (event 502). From initial state 505, logic 190 transitions to state 510 and initializes ASTC 385 when the PTS for the first decodable audio frame is received (event 515). From state 510, logic 190 may transition to state 520 and initialize VSTC 390 when the PTS for the first decodable video frame arrives (event 525). Alternatively, if the PTS for the first decodable video frame is received while in initial state 505, logic 190 may transition to state 530 and initialize VSTC 390 then may transition to state 535 and initialize ASTC 385 when the PTS for the first decodable audio frame arrives (event 515).

From either state 520 or state 535, independent decoder clocking logic 190 may transition unconditionally to state 540. From state 540, logic 190 may transition to state 555 and start both ASTC 385 and VSTC 390 when the video preroll delay elapses (event 550). Logic 190 may move unconditionally from state 555 to state 570, where decoding begins. Finally, when a new stream begins (event 502) logic 190 may return to initial state 505.

Independent decoder clocking logic 190 may be utilized in any digital media receiver that receives an encoded video stream and a corresponding encoded audio stream. Examples of such devices may include set-top boxes, personal video recorders, home media center, residential gateway, hand-held and/or mobile receivers that are coupled to a transmission channel, video-services-enabled receivers (VSERs), and other electronic devices such as media players.

Figure 6:
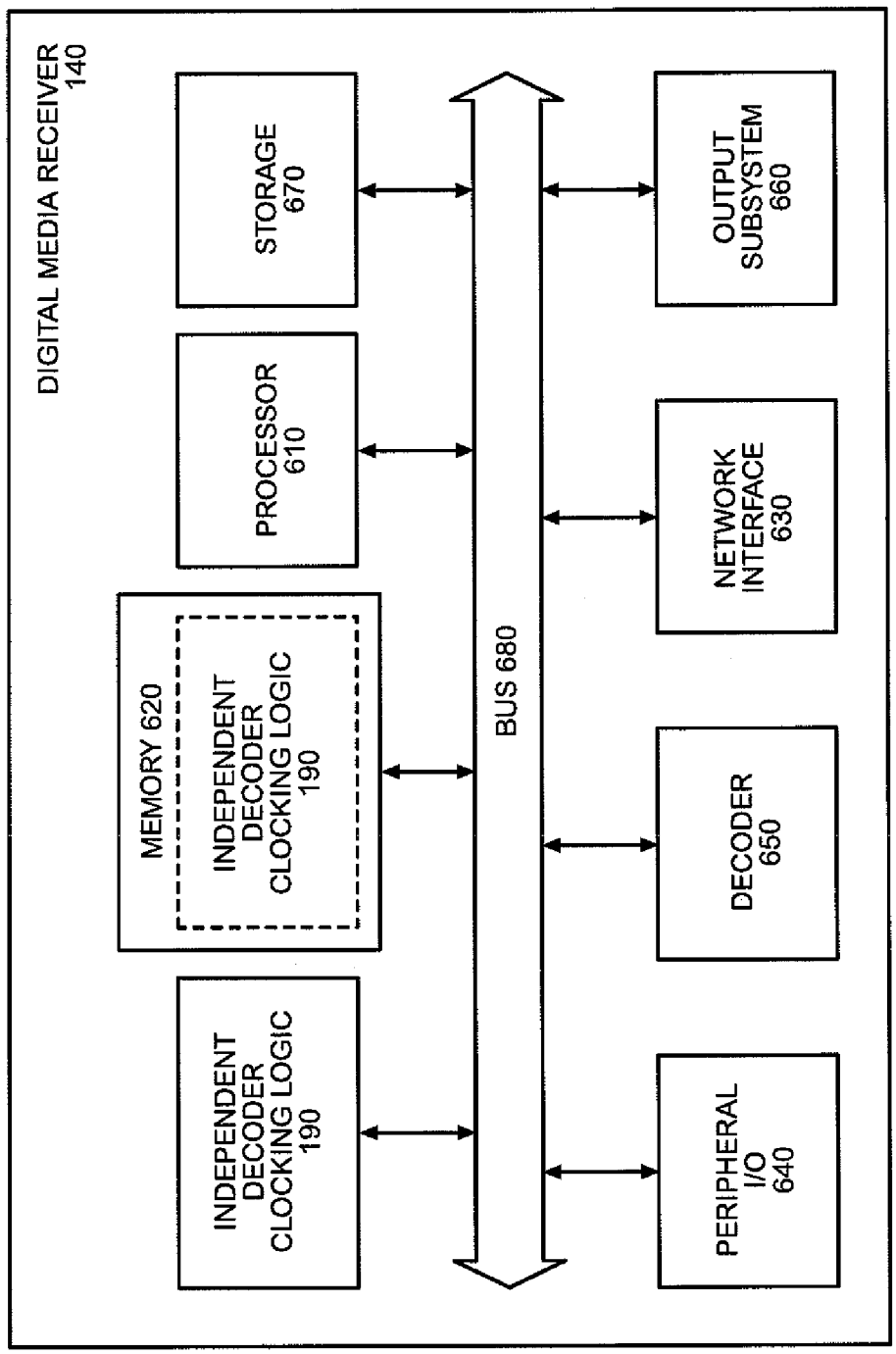
FIG. 6 is a block diagram of embodiments of a digital media receiver.

FIG. 6 is a block diagram of one embodiment of digital media receiver 140. Digital media receiver 140 may contain a number of components that are well known in the computer arts, including a processor 610, memory 620, a network interface 630, a peripheral input output (I/O) interface 640, a decoder 650, and an output subsystem 660. Some embodiments may also include a storage device 670 (e.g., non-volatile memory or a disk drive). These components may be coupled via a bus 680.

Peripheral I/O interface 640 may provide input and output signals, for example, user inputs from a remote control or front panel buttons or a keyboard, and outputs such as LEDs or LCD on the front panel. Network interface 630 may receive streams. Decoder 650 may decode an incoming video stream into a stream of decoded video frames and an incoming audio stream into a stream of decoded audio streams. Output subsystem 660 may convert the decoded video frames into a video signal for display by a computer monitor or a television and may convert the decoded audio frames into an audio signal for play over speakers.

As described above, digital media receiver 140 receives digital video streams via network interface 630. In some embodiments, this is a local area network (LAN) interface or a wide area network (WAN) interface such as the Internet. In other embodiments, network interface 630 interfaces to a radio frequency (RF) network, and in such embodiments digital media receiver 140 may include a tuner/demodulator (not shown) which processes digital signals received over the RF network.

As shown in FIG. 6, independent decoder clocking logic 190 may be implemented in hardware, or may reside in memory 620 as instructions which, when executed by processor 610, may implement systems and methods of processing a media stream. Hardware implementations may include, but are not limited to, a programmable logic device (PLD), programmable gate array (PGA), field programmable gate array (FPGA), an application-specific integrated circuit (ASIC), a system on chip (SoC), and a system in package (Sip). Furthermore, independent decoder clocking logic 190 may be implemented as a combination of hardware logic and processor-executable instructions (software).

Independent decoder clocking logic 190 may be embodied in any computer-readable medium for use by or in connection with an instruction execution system, apparatus, or device. Such instruction execution systems may include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or that is based on electronic, magnetic, optical, electromagnetic, infrared, or semiconductor technology.

Specific examples of a computer-readable medium using electronic technology would include (but are not limited to) the following: random access memory (RAM); read-only memory (ROM); and erasable programmable read-only memory (EPROM or Flash memory). A specific example using magnetic technology includes (but is not limited to) a portable computer diskette. Specific examples using optical technology include (but are not limited to) compact disk (CD) and digital video disk (DVD).

Any software components illustrated herein are abstractions chosen to illustrate how functionality may be partitioned among components in some embodiments of independent decoder clocking logic 190 disclosed herein. Other divisions of functionality may also be possible, and these other possibilities may be intended to be within the scope of this disclosure. Furthermore, to the extent that software components may be described in terms of specific data structures (e.g., arrays, lists, flags, pointers, collections, etc.), other data structures providing similar functionality can be used instead.

Any software components included herein are described in terms of code and data, rather than with reference to a particular hardware device executing that code. Furthermore, to the extent that system and methods are described in object-oriented terms, there is no requirement that the systems and methods be implemented in an object-oriented language. Rather, the systems and methods can be implemented in any programming language, and executed on any hardware platform.

Any software components referred to herein include executable code that is packaged, for example, as a standalone executable file, a library, a shared library, a loadable module, a driver, or an assembly, as well as interpreted code that is packaged, for example, as a class. In general, the components used by the systems and methods of reducing media stream delay are described herein in terms of code and data, rather than with reference to a particular hardware device executing that code. Furthermore, the systems and methods can be implemented in any programming language, and executed on any hardware platform.

The flow charts, messaging diagrams, state diagrams, and/or data flow diagrams herein provide examples of the operation of systems and methods of reducing media stream delay through independent decoder clocks, according to embodiments disclosed herein. Alternatively, these diagrams may be viewed as depicting actions of an example of a method implemented by independent decoder clocking logic 190. Blocks in these diagrams represent procedures, functions, modules, or portions of code which include one or more executable instructions for implementing logical functions or steps in the process. Alternate implementations may also be included within the scope of the disclosure. In these alternate implementations, functions may be executed out of order from that shown or discussed, including substantially concurrently or in reverse order, depending on the functionality involved. The foregoing description has been presented for purposes of illustration and description. It is not intended to be exhaustive or to limit the disclosure to the precise forms disclosed. Obvious modifications or variations are possible in light of the above teachings. The implementations discussed, however, were chosen and described to illustrate the principles of the disclosure and its practical application to thereby enable one of ordinary skill in the art to utilize the disclosure in various implementations and with various modifications as are suited to the particular use contemplated. All such modifications and variation are within the scope of the disclosure as determined by the appended claims when interpreted in accordance with the breadth to which they are fairly and legally entitled.

What is claimed is:

1. A method of processing a program stream, the program stream comprising a video and an audio stream, the method comprising:

initializing an audio reference clock to a value associated with a presentation timestamp for a decodable audio frame which is the first audio frame capable of being decoded in the audio stream;

initializing a video reference clock to a value associated with a presentation timestamp for a decodable video frame which is the first video frame capable of being decoded in the video stream;

storing audio frames received prior to receipt of the decodable video frame which is the first video frame capable of being decoded in the video stream in an audio frame buffer;

starting the audio reference clock and the video reference clock after a video preroll delay elapses, wherein the video preroll delay is the difference between the first decodable video frame presentation timestamp and the value of a program clock reference at the time that the first decodable video frame presentation timestamp is received, wherein the presentation timestamp of the first audio frame is earlier than the presentation timestamp of the first video frame, wherein the video reference clock is configured to run at a slower rate than the audio reference clock, and wherein the video reference clock is normalized when the audio reference clock catches up with the video reference clock;

decoding the audio stream in accordance with the audio reference clock; and decoding the video stream in accordance with the video reference clock.

2. The method of claim 1, further comprising: initializing the audio reference clock to a presentation timestamp value for the first decodable frame in the audio stream.

3. The method of claim 1, further comprising: initializing the video reference clock to a presentation timestamp value for the first decodable frame in the video stream.

4. The method of claim 1, further comprising: initializing the video reference clock responsive to receipt of a presentation timestamp for the first decodable frame in the video stream.

5. The method of claim 1, further comprising: initializing the audio reference clock responsive to receipt of a presentation timestamp for the first decodable frame in the audio stream.

6. The method of claim 1, further comprising: setting the rate of the video reference clock to the same as the rate of the audio reference clock, responsive to current values of the video reference clock and the audio reference clock being the same.

7. A digital media playback device comprising:
an audio reference clock;
an audio frame buffer configured to store received frames in an audio stream; an audio decoder configured to decode frames in an audio decoder buffer at times based on a comparison of a time stamp for each frame and a current value of the audio reference clock;
a video reference clock;
a video frame buffer configured to store received frames in a video stream, the video stream and the audio stream making up a program stream;
a video decoder configured to decode frames in a video decoder buffer at times based on a comparison of a timestamp for each frame and a current value of the video reference clock; and
independent decoder clocking logic configured to:
set the audio reference clock to an initial value based on a presentation timestamp for a frame that is the first decodable frame in the audio stream;
set the video reference clock to an initial value based on a presentation timestamp for a frame that is the first decodable frame in the video stream; and
start the audio and the video reference clocks after a video preroll delay elapses, wherein the video preroll delay is the difference between the first decodable video frame presentation timestamp and a value of a program clock reference at the time that the first decodable video frame presentation timestamp is received, wherein the presentation timestamp of the first audio frame is earlier than the presentation timestamp of the first video frame, wherein the video reference clock is configured to run at a slower rate than the audio reference clock, and wherein the video reference clock is normalized when the audio reference clock catches up with the video reference clock.

8. The device of claim 7, further comprising channel change request logic, wherein the setting the audio and video reference clocks is responsive to the channel change request logic.

9. The device of claim 7, wherein the initial value of the audio reference clock is a presentation timestamp value for the first decodable frame in the audio stream.

10. The device of claim 7, wherein the initial value of the video reference clock is equal to the value of a presentation timestamp for the first decodable frame in the video stream.

11. The device of claim 7, wherein the logic configured to set the video reference clock is responsive to receipt of a presentation timestamp for the first decodable frame in the video stream.

12. The device of claim 7, further comprising: logic to set the rate of the video reference clock to the same as the rate of the audio reference clock, responsive to values in the video reference clock and the audio reference clock being the same.

* * * * *